United States Patent
Natori

(10) Patent No.: US 10,442,436 B2
(45) Date of Patent: Oct. 15, 2019

(54) VEHICLE DRIVING DEVICE

(71) Applicant: TOYOTA JIDOSHA KABUSHIKI KAISHA, Toyota-shi, Aichi-ken (JP)

(72) Inventor: Akio Natori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 15/843,040

(22) Filed: Dec. 15, 2017

(65) Prior Publication Data

US 2018/0178799 A1 Jun. 28, 2018

(30) Foreign Application Priority Data

Dec. 27, 2016 (JP) .................................. 2016-252608

(51) Int. Cl.
*B60W 30/188* (2012.01)
*B60W 10/06* (2006.01)
*B60W 50/10* (2012.01)
*B60R 16/023* (2006.01)
*B60W 10/107* (2012.01)

(52) U.S. Cl.
CPC ..... *B60W 30/1882* (2013.01); *B60R 16/0236* (2013.01); *B60W 10/06* (2013.01); *B60W 10/107* (2013.01); *B60W 50/10* (2013.01); *B60W 2540/30* (2013.01); *Y02T 10/84* (2013.01)

(58) Field of Classification Search
None
See application file for complete search history.

(56) References Cited

U.S. PATENT DOCUMENTS

| 5,545,106 | A | 8/1996 | Senger et al. |
| 6,205,379 | B1 | 3/2001 | Morisawa et al. |
| 2011/0276211 | A1 | 11/2011 | Teraya |
| 2013/0245875 | A1* | 9/2013 | Imamura .................. B60K 6/44 701/22 |
| 2014/0129115 | A1* | 5/2014 | Teraya ................ F02D 41/0225 701/103 |
| 2014/0195090 | A1 | 7/2014 | Takeuchi et al. |
| 2016/0001769 | A1* | 1/2016 | Kamioka ............... B60K 6/485 701/22 |

(Continued)

FOREIGN PATENT DOCUMENTS

| JP | H03-204469 A | 9/1991 |
| JP | H07-508088 A | 9/1995 |

(Continued)

*Primary Examiner* — Justin Holmes
(74) *Attorney, Agent, or Firm* — Oliff PLC

(57) ABSTRACT

A vehicle driving device includes an engine, a continuously variable transmission, and a controller. The controller controls the engine and the continuously variable transmission such that an operating point determined by a rotation number and an output torque of the engine follows at least one operating line. In a region where the rotation number of the engine is smaller than a predetermined value, the operating line is set on an optimum fuel efficiency line. In a region where the rotation number equals to or larger than a predetermined value an increasing amount of the output torque relative to an increasing amount of the rotation number in the operating line is larger than the increasing amount of the output torque relative to the increasing amount of the rotation number in the optimum fuel efficiency line.

3 Claims, 7 Drawing Sheets

(56) References Cited

U.S. PATENT DOCUMENTS

| | | | |
|---|---|---|---|
| 2016/0068161 A1* | 3/2016 | Iketomi | B60W 10/111 477/3 |
| 2016/0107519 A1* | 4/2016 | Tagawa | B60W 20/40 180/65.25 |
| 2016/0129910 A1 | 5/2016 | Amano et al. | |
| 2016/0272187 A1* | 9/2016 | Yukawa | B60K 6/48 |

FOREIGN PATENT DOCUMENTS

| | | |
|---|---|---|
| JP | 2000-079833 A | 3/2000 |
| JP | 2007-190972 A | 8/2007 |
| JP | 2009-074524 A | 4/2009 |
| JP | 2010-120449 A | 6/2010 |
| JP | 2016-094936 A | 5/2016 |
| WO | 2010/079609 A1 | 7/2010 |
| WO | 2013/042177 A1 | 3/2013 |

\* cited by examiner

FIG. 7

| Ne AND OPERATING LINE / dPAP | 0<Ne<Ne1 | Ne1 | Ne2 | Ne3 | Ne4 | Ne5 | OPERATING LINE |
|---|---|---|---|---|---|---|---|
| dPAPspd3<dPAP | OPTIMUM FUEL EFFICIENCY LINE | k31 | k32 | k33 | k34 | k35 | L3 |
| dPAPspd2<dPAP ≤dPAPspd3 | ↑ | k21 | k22 | k23 | k24 | k25 | L2 |
| dPAPspd1<dPAP ≤dPAPspd2 | ↑ | k11 | k12 | k13 | k14 | k15 | L1 |
| 0<dPAP≤ dPAPspd1 | ↑ | k01 | k02 | k03 | k04 | k05 | L0 |
| dPAPspdm1<dPAP ≤0 | ↑ | km11 | km12 | km13 | km14 | km15 | Lm1 |
| dPAPspdm2<dPAP ≤dPAPspdm1 | ↑ | km21 | km22 | km23 | km24 | km25 | Lm2 |
| dPAP≤ dPAPspdm2 | ↑ | km31 | km32 | km33 | km34 | km35 | Lm3 |

FIG. 8

| Ne AND OPERATING LINE / dPAP | 0<Ne<Ne1 | Ne1 | Ne2 | Ne3 | Ne4 | Ne5 | OPERATING LINE |
|---|---|---|---|---|---|---|---|
| dPAPspd3 | OPTIMUM FUEL EFFICIENCY LINE | k31 | k32 | k33 | k34 | k35 | L3 |
| dPAPspd2 | ↑ | k21 | k22 | k23 | k24 | k25 | L2 |
| dPAPspd1 | ↑ | k11 | k12 | k13 | k14 | k15 | L1 |
| 0 | ↑ | k01 | k02 | k03 | k04 | k05 | L0 |
| dPAPspdm1 | ↑ | km11 | km12 | km13 | km14 | km15 | Lm1 |
| dPAPspdm2 | ↑ | km21 | km22 | km23 | km24 | km25 | Lm2 |
| dPAPspdm3 | ↑ | km31 | km32 | km33 | km34 | km35 | Lm3 |
| MEAN VALUE OF REFERENCE VALUES | ↑ | DETERMINE BY INTERPOLATION CALCULATION | | | | | |

VEHICLE DRIVING DEVICE

INCORPORATION BY REFERENCE

The disclosure of Japanese Patent Application No. 2016-252608 filed on Dec. 27, 2016 including the specification, drawings and abstract is incorporated herein by reference in its entirety.

BACKGROUND

1. Technical Field

This disclosure relates to a vehicle driving device.

2. Description of Related Art

There has been known a continuously variable transmission (CVT) as a transmission that improves fuel efficiency of an engine. The continuously variable transmission can continuously change a transmission ratio so as to achieve an optimum engine rotation number in terms of fuel efficiency or power performance even if a vehicle speed changes.

In a vehicle disclosed in Japanese Patent Application Publication No. 2009-074524 (JP 2009-074524 A), a transmission ratio of a continuously variable transmission is set so that an engine rotation number becomes a rotation number on an optimum fuel efficiency line formed by connecting optimum fuel efficiency operating points determined in advance.

In a vehicle disclosed in International Publication WO2013/042177, an optimum fuel efficiency line is selected as an operating point at the time of normal running. In the meantime, in the vehicle disclosed in WO2013/042177, when a gap occurs between a target acceleration and an actual acceleration, an operating line in which a torque increasing amount relative to an increasing amount of an engine rotation number is larger than that in the optimum fuel efficiency line is selected.

SUMMARY

FIG. 2 illustrates a coordinate plane with a horizontal axis indicative of a rotation number of an engine and a vertical axis indicative of an output torque. As illustrated in FIG. 2, in a case of a low-rotation high-torque-output type engine, an inclination of an optimum fuel efficiency line LF on a coordinate plane tends to be small in a high-rotation region. That is, at the time of high rotation of the engine, an increasing amount of an output torque relative to an increasing amount of an engine rotation number in the optimum fuel efficiency line LF tends to become small as compared to a case of low rotation. On this account, when a driver just slightly steps on an accelerator pedal, a rotation number of the engine greatly increases (that is, the engine blows up), while an increase of the output torque is very small. This causes the driver to have uncomfortable feeling of drive due to insufficient acceleration feeling.

This disclosure provides a vehicle driving device that reduces uncomfortable feeling of drive due to insufficient acceleration feeling at the time when a driver steps on an accelerator pedal in a vehicle provided with an engine and a continuously variable transmission.

An aspect of this disclosure is related to a vehicle driving device. The vehicle driving device includes an engine, a continuously variable transmission, and a controller. The continuously variable transmission is configured to change a speed of a rotational power transmitted from the engine and to output the rotational power to a driving-wheel side. The controller is configured to control the engine and the continuously variable transmission such that an operating point determined by a rotation number of the engine and an output torque of the engine follows at least one operating line. In a region where the rotation number is smaller than a predetermined value, the operating line is set on an optimum fuel efficiency line. The optimum fuel efficiency line is a line that connects optimum fuel efficiency operating points determined in advance. In a region where the rotation number equals to or larger than the predetermined value, an increasing amount of the output torque relative to an increasing amount of the rotation number in the operating line is larger than the increasing amount of the output torque relative to the increasing amount of the rotation number in the optimum fuel efficiency line.

In the above configuration, in the region where the rotation number equals to or larger than the predetermined value, the operating line is set such that the increasing amount of the output torque relative to the increasing amount of the rotation number is larger than that in the optimum fuel efficiency line. Accordingly, when the engine and the continuously variable transmission are controlled in accordance with the operating line, the increasing amount of the rotation number relative to the increasing amount of the output torque of the engine is smaller than that in a case where the optimum fuel efficiency line is employed. This makes it is possible to reduce uncomfortable feeling of drive due to insufficient acceleration feeling at the time when a driver steps on an accelerator pedal.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 7 is a table indicative of a relationship between a change amount of an accelerator operation amount and an operating line to be selected in the second embodiment; and FIG. 8 is a table indicative of a relationship between a change amount of an accelerator operation amount and an operating line to be selected in a modification of the second embodiment.

DETAILED DESCRIPTION OF EMBODIMENTS

In the vehicle driving device of the present disclosure, a plurality of operating lines may be set in the region where the rotation number equals to or larger than the predetermined value. The plurality of operating lines may have different values for an output torque at the same rotation number. The controller may be configured to select any operating line from among the plurality of operating lines based on an index indicative of a driving intention of a driver.

According to the above configuration, it is possible to select an optimum operating line corresponding to the driving intention of the driver from among the plurality of operating lines, thereby making it possible to improve driving comfortability. Note that the plurality of operating lines as used herein may be operating lines discretely determined in advance, and further, at least one of the plurality of operating lines may be an operating line derived from interpolation calculation based on other operating lines determined in advance.

In the vehicle driving device, the controller may be configured to select an operating line having a larger output torque at the same rotation number as an increasing amount of an accelerator operation amount per time is larger, from among the plurality of operating lines.

According to the above configuration, it is possible to select an optimum operating line according to the increasing amount of the accelerator operation amount per time.

Referring to the accompanying drawings, descriptions are now made of embodiments of this disclosure. A first embodiment as an example is such that the present disclosure is applied to a vehicle driving device including an engine 1 and a continuously variable transmission 4 provided laterally in a vehicle, as schematically illustrated in FIG. 1.

Figure 1:
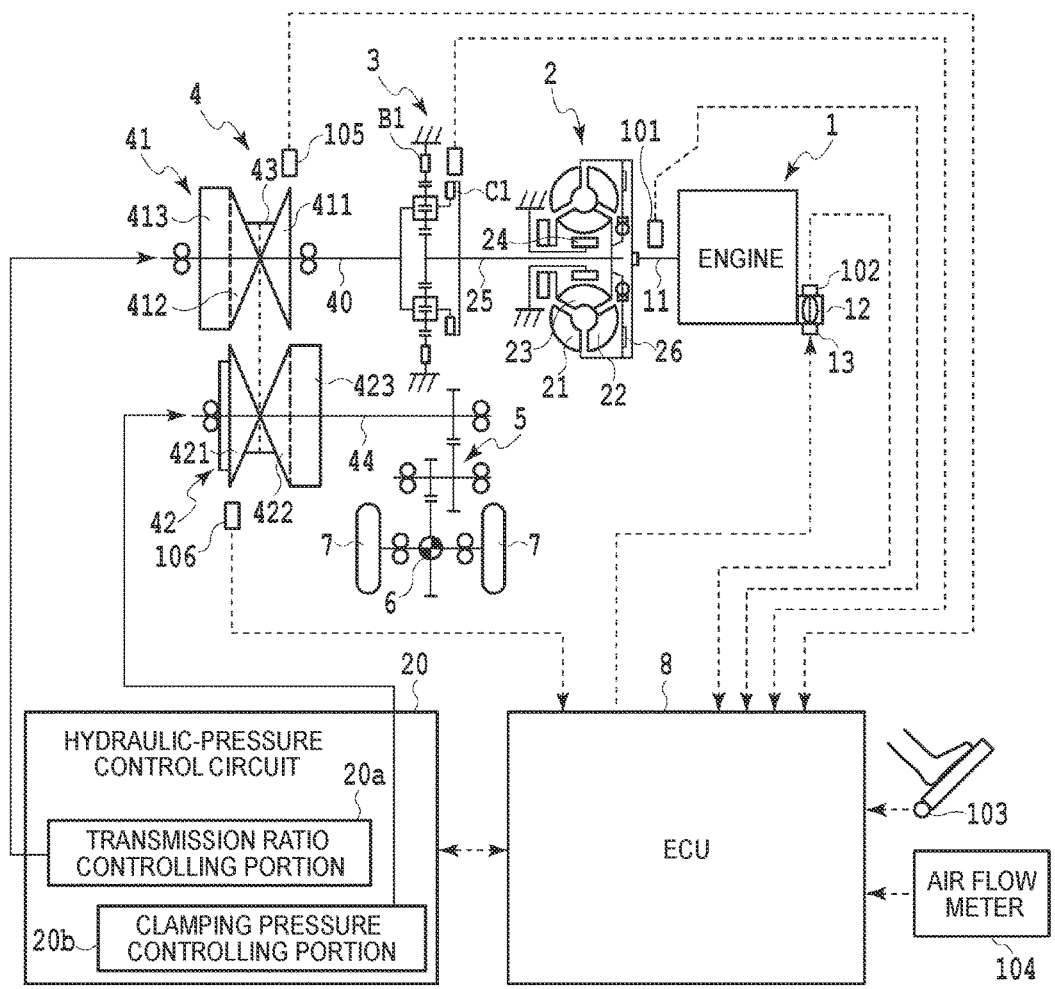
FIG. 1 is a schematic configuration diagram of a vehicle including a vehicle driving device according to an embodiment of the disclosure.

As schematically illustrated in FIG. 1, the vehicle driving device of the present embodiment includes a torque converter 2, a forward/reverse switching mechanism 3, the continuously variable transmission 4, a reduction gear mechanism 5, and a differential gear mechanism 6, in addition to the engine 1 as a power source for running. A crankshaft 11 of the engine 1 is connected to the torque converter 2, and its output is transmitted from the torque converter 2 to the differential gear mechanism 6 through the forward/reverse switching mechanism 3, the continuously variable transmission 4, and the reduction gear mechanism 5, so as to be distributed between right and left driving wheels 7.

The engine 1 is a so-called direct injection gasoline internal combustion engine configured to directly inject fuel into a cylinder and to control an injection amount and a timing thereof so as to achieve homogeneous combustion and stratified charge combustion. However, the engine 1 may be other types of internal combustion engines. The engine 1 includes: a throttle valve 12 that can electrically control a throttle opening degree; and a fuel injection valve that can electrically control a fuel injection amount. The engine 1 further includes a variable valve timing mechanism (VVT) configured to open and close an intake valve and an exhaust valve at a predetermined timing. The VVT can adjust timings of opening and closing of the intake valve and the exhaust valve by adjusting a relative rotational phase between a cam shaft and a crankshaft. The VVT may further be able to adjust lift amounts of the intake valve and the exhaust valve. The engine 1 further includes an EGR passage that connects an exhaust passage to an intake passage so as to introduce burned gas into the intake passage, and an EGR valve for opening and closing the EGR passage.

The engine 1 includes an engine rotation number sensor 101 configured to calculate an engine rotation number. Further, the throttle valve 12 is operated by a throttle motor 13. An opening degree (a throttle opening Th) of the throttle valve 12 is controlled by an electronic control unit (ECU) 8 so that a target intake amount is obtained. Note that the throttle opening degree Th is detected by a throttle angle sensor 102.

The torque converter 2 is a fluid power transmission mechanism. The torque converter 2 includes an input-side pump impeller 22 connected to the crankshaft 11 of the engine 1, an output-side turbine runner 21 connected to the forward/reverse switching mechanism 3 via a turbine shaft 25, a stator 23 having a torque amplification function, a one-way clutch 24, and a lock-up clutch 26.

The forward/reverse switching mechanism 3 is a double-pinion-type planetary gear mechanism, and includes a forward clutch C1 and a reverse brake B1 as frictional engagement elements. When the forward clutch C1 and the reverse brake B1 are selectively engaged, a forward/reverse travel and a neutral state can be achieved.

The continuously variable transmission 4 is a belt-type continuously variable transmission (CVT). The continuously variable transmission 4 can continuously change a speed of rotation to be input from the engine 1 via the torque converter 2 and the forward/reverse switching mechanism 3, so as to output the rotation from an output shaft 44. The continuously variable transmission 4 includes a primary pulley 41 on an input side (a driving side), a secondary pulley 42 on an output side (a driven side), and a metal transmission belt 43 (an endless transmission member: including a chain-type belt) wound around the primary pulley 41 and the secondary pulley 42, and the like.

More specifically, the primary pulley 41 includes a fixed sheave 411 fixed to an input shaft 40, and a moving sheave 412 disposed in the input shaft 40 so as to be slidable only in an axial direction. By changing a V-groove width between the fixed sheave 411 and the moving sheave 412 by a hydraulic actuator 413 disposed on the moving sheave 412 side, a winding radius (an effective radius) of the transmission belt 43 is changed.

Similarly, the secondary pulley 42 includes a fixed sheave 421 fixed to the output shaft 44, and a moving sheave 422 disposed in the output shaft 44 so as to be slidable only in an axial direction. By changing a V-groove width between the fixed sheave 421 and the moving sheave 422 by a hydraulic actuator 423 disposed on the moving sheave 422 side, a winding radius (an effective radius) of the transmission belt 43 is changed.

Then, by controlling the hydraulic actuator 413 of the primary pulley 41 so as to change respective V-groove widths of the primary pulley 41 and the secondary pulley 42, respective effective radii of the pulleys 41, 42 are changed continuously, so that a transmission ratio $\gamma$ can be changed continuously. Note that the transmission ratio $\gamma$ is defined as $\gamma$=input shaft rotation number Nin/output shaft rotation number Nout. For example, when the effective radius of the primary pulley 41 increases and the effective radius of the secondary pulley 42 decreases (up-shift), the transmission ratio $\gamma$ becomes small.

A primary pulley rotation number sensor 105 is placed near the primary pulley 41. An input shaft rotation number Nin of the continuously variable transmission 4 can be calculated from an output signal of the primary pulley rotation number sensor 105. Further, a secondary pulley rotation number sensor 106 is placed near the secondary pulley 42, and an output shaft rotation number Nout of the continuously variable transmission 4 can be calculated from an output signal thereof. A vehicle speed v can be calculated from the output shaft rotation number Nout. Note that a vehicle speed sensor may be placed near the driving wheels 7 so as to detect the vehicle speed v.

A hydraulic-pressure control circuit 20 for controlling the torque converter 2, the forward/reverse switching mechanism 3, the continuously variable transmission 4, and the like includes a transmission ratio controlling portion 20a configured to mainly control a hydraulic pressure of the hydraulic actuator 413 of the primary pulley 41 at the time when the transmission ratio γ of the continuously variable transmission 4 is changed, and a clamping pressure controlling portion 20b configured to mainly control a hydraulic pressure of the hydraulic actuator 423 of the secondary pulley 42. Note that, although not illustrated in FIG. 1, the hydraulic-pressure control circuit 20 is also configured to perform a control of a line pressure, a hydraulic pressure control for engagement and disengagement of a lock-up clutch of the torque converter 2, and a hydraulic pressure control for engagement and disengagement of the forward clutch C1 and the reverse brake B1 of the forward/reverse switching mechanism 3.

The electronic control unit (ECU) 8 configured to control a throttle opening degree (load) and a fuel injection amount of the engine 1, a transmission ratio and a torque capacity (e.g., a belt clamping pressure) of the continuously variable transmission 4, and the like is provided. Although not illustrated herein, the ECU 8 includes a Central Processing Unit (CPU), a Read Only Memory (ROM), a Random Access Memory (RAM), a backup RAM, and so on. The ECU 8 is an example of a controller. The CPU executes various computing processes based on various control programs and maps stored in the ROM. Further, the RAM temporarily stores therein computing results in the CPU, data input from various sensors, and the like, and the backup RAM stores therein data and the like to be stored at the time of stop of the engine 1, for example.

The engine rotation number sensor 101, the throttle angle sensor 102, an accelerator operation amount sensor 103 for detecting an accelerator operation amount, i.e., a stepping angle of an accelerator pedal, an air flow meter 104 provided in the intake passage so as to detect an intake air amount, the primary pulley rotation number sensor 105, the secondary pulley rotation number sensor 106, and the like, which are all illustrated in FIG. 1, are connected to an input interface of the ECU 8. In the meantime, a fuel injection device, an ignition device, and the like of the engine 1 are connected to an output interface thereof in addition to the throttle motor 13 and the hydraulic-pressure control circuit 20 illustrated in FIG. 1, and the ECU 8 executes a control of the engine 1, a control of the torque converter 2, a control of the forward/reverse switching mechanism 3, a control of the continuously variable transmission 4, and the like based on output signals of various sensors and the like.

For example, as an operation control of the engine 1, control signals are output to the throttle motor 13, the fuel injection device, the ignition device, and the like, so that an intake amount, a fuel injection amount, an ignition timing, and the like are controlled. In terms of the torque converter 2, engagement and disengagement of the lock-up clutch are controlled, and in terms of the forward/reverse switching mechanism 3, engagement and disengagement of the forward clutch C1 and the reverse brake B1 are controlled. In terms of the continuously variable transmission 4, the hydraulic actuators 413, 423 are controlled, so that the transmission ratio and the torque capacity (e.g., the belt clamping pressure) are controlled. Note that such a configuration may be employed that the control of the engine 1 and the control of the continuously variable transmission 4 are executed by individual electronic control units, and they are connected to each other in a data exchangeable manner.

Figure 2:
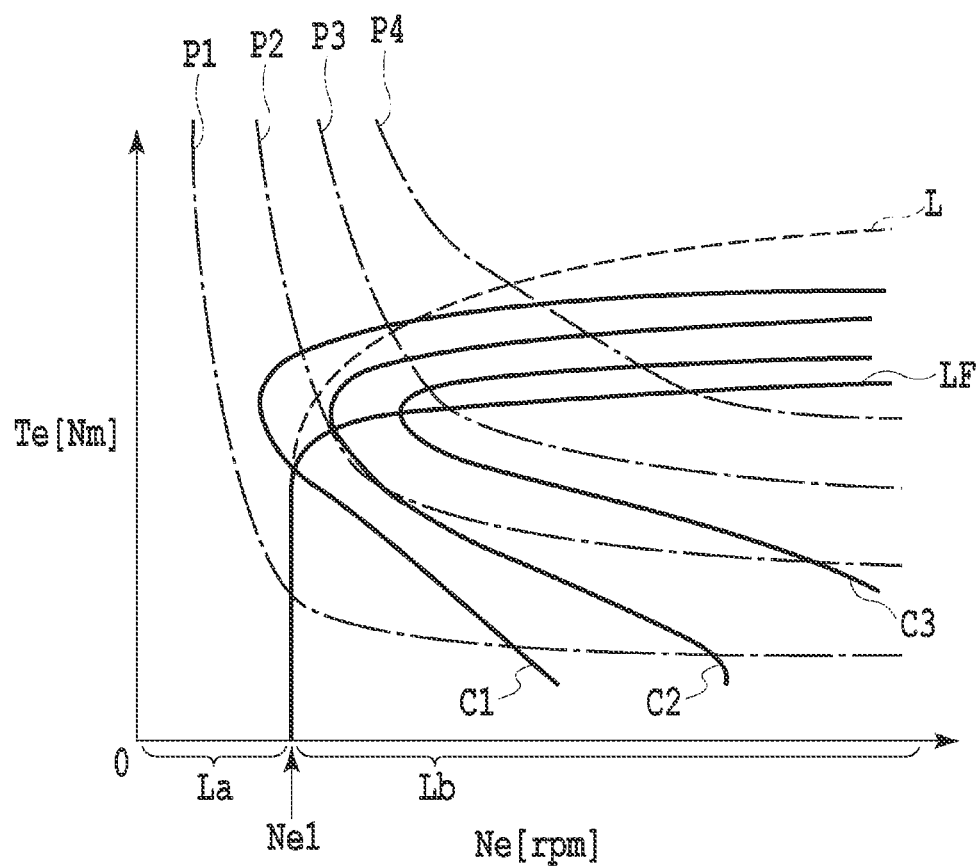
FIG. 2 is a graph illustrating an operating line and an optimum fuel efficiency line in a first embodiment on a coordinate plane with a horizontal axis indicative of an engine rotation number and a vertical axis indicative of an engine torque.

FIG. 2 is a graph illustrating equal fuel consumption ratio lines c1 to c3, equal power lines p1 to p4, an optimum fuel efficiency line LF, and an operating line L, on a coordinate plane with a horizontal axis indicative of an engine rotation number Ne and a vertical axis indicative of an engine torque Te (an output torque). The equal fuel consumption ratio lines c1 to c3 are obtained such that fuel consumption ratios (=fuel consumption/driving wheel output) are found from fuel injection amounts of the fuel injection device and plotted, and points having the same fuel consumption ratio are connected. The equal power lines p1 to p4 per power (output) are put on the equal fuel consumption ratio lines c1 to c3, and among intersection points between the equal power lines p1 to p4 and the equal fuel consumption ratio lines c1 to c3, points at which the fuel consumption ratio is minimized (that is, optimum fuel efficiency operating points) are connected, so that the optimum fuel efficiency line LF is obtained.

The operating line L is a line that determines target values of the engine rotation number Ne and the engine torque Te on the coordinate plane with the horizontal axis indicative of the engine rotation number Ne and the vertical axis indicative of the engine torque Te. The operating line L in the present embodiment is set such that: (i) in a region La where the engine rotation number Ne is smaller than a predetermined threshold Ne1, the operating line L accords with the optimum fuel efficiency line LF in which a fuel consumption relative to an engine power is minimized; and (ii) in a whole region Lb where the engine rotation number Ne equals to or larger than the threshold Ne1, an increasing amount of the engine torque Te relative to an increasing amount of the engine rotation number Ne from the same engine rotation number Ne becomes larger than that in the optimum fuel efficiency line LF (that is, an inclination of the operating line L is larger than that of the optimum fuel efficiency line LF). Further, in the whole region Lb where the engine rotation number Ne equals to or larger than the threshold Ne1, the operating line L is set on a large torque side relative to the optimum fuel efficiency line LF at the same rotation number. The threshold Ne1 is set to a rotation number sufficiently higher than an idling rotation number, e.g., 2500 rpm, but may be other values. Note that, in the present embodiment, only a single operating line L is used in the controls of the engine 1 and the continuously variable transmission 4, and in the region Lb where the engine rotation number Ne equals to or larger than the threshold Ne1, the optimum fuel efficiency line LF is merely illustrated for comparison in FIG. 2 and is not used in the controls of the engine 1 and the continuously variable transmission 4 in the present embodiment. That is, the ECU 8 in the present embodiment controls the engine 1 and the continuously variable transmission 4, so that an operating point determined by the engine rotation number Ne and the engine torque Te follows only the operating line L.

As such, the ECU 8 calculates a target engine torque Te0 by use of the operating line L prepared as a map, and controls an engine load to achieve the target engine torque Te0. Further, by use of the operating line L, the ECU 8 calculates a target engine rotation number Ne0, and controls the transmission ratio γ of the continuously variable transmission 4 to achieve the target engine rotation number Ne0.

The transmission ratio γ of the continuously variable transmission 4 is controlled so that the engine rotation number Ne reaches the target engine rotation number Ne0 on the operating line L. For example, a requested driving force is calculated by the ECU 8 based on a stepping amount (an accelerator operation amount) PAP of the accelerator pedal and a vehicle speed v, and a target engine power [kW] to output the requested driving force is computed by the ECU 8 based on the requested driving force [N] and the vehicle speed [km/h]. A target engine rotation number Ne0 [rpm] is found based on the target engine power and the operating line L, and the transmission ratio γ of the continuously variable transmission 4 is controlled so as to achieve the target engine rotation number Ne0. In the meantime, a target engine torque Te0 [Nm] is computed based on the target engine power and the operating line L, and the throttle opening degree and the like of the engine 1 are controlled so as to achieve the target engine torque Te0 thus obtained.

Figure 3:
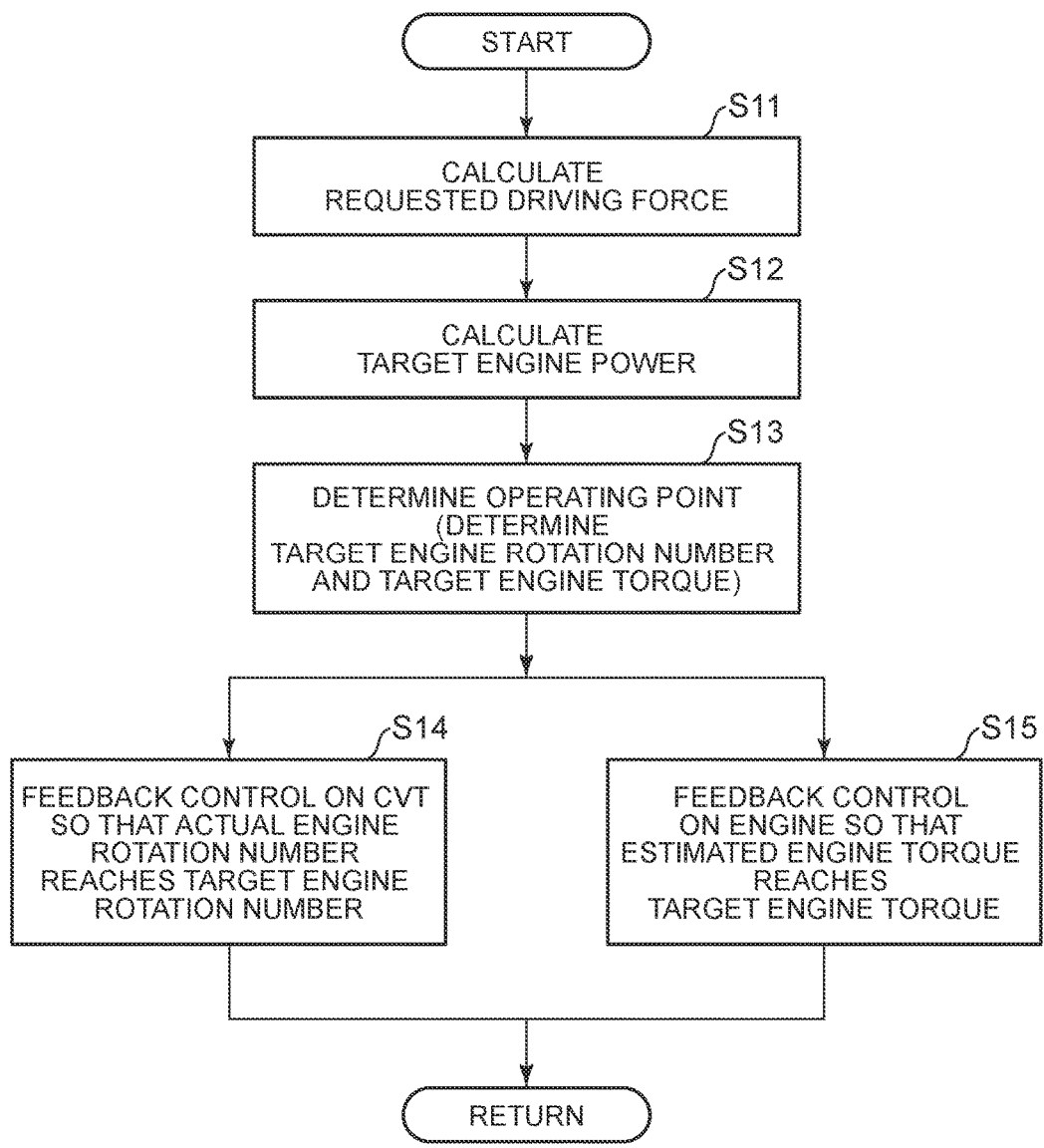
FIG. 3 is a flowchart illustrating a control processing routine of an engine and a continuously variable transmission in the first embodiment.

FIG. 3 is a flowchart illustrating a control processing routine of the engine 1 and the continuously variable transmission 4 to be performed by the ECU 8. The processing routine is executed repeatedly every predetermined control period Δt during an operation of the engine 1.

First, a requested driving force is calculated by the ECU 8 based on an accelerator operation amount PAP and a vehicle speed v (S11). Then, based on the requested driving force, a target engine power is calculated in the ECU 8 by multiplying the vehicle speed v by the requested driving force (S12).

Subsequently, the ECU 8 calculates a target engine rotation number Ne0 and a target engine torque Te0 by referring to the operating line L based on the target engine power (S13). That is, an intersection point between an equal power line corresponding to a value of the target engine power and the operating line L is selected as an operating point, and an engine rotation number Ne and an engine torque Te indicated by the operating point are determined as the target engine rotation number Ne0 and the target engine torque Te0.

Then, the ECU 8 performs a feedback control on the transmission ratio y of the continuously variable transmission 4 so that an engine rotation number Ne detected by the engine rotation number sensor 101 reaches the target engine rotation number Ne0 (S14). In parallel with this, the ECU 8 adjusts various parameters (a throttle opening degree, an ignition timing, a VVT advance amount, an EGR amount) of the engine 1 so that an estimated engine torque Te reaches the target engine torque Te0, so as to perform a feedback control on the engine 1 (S15). The estimated engine torque Te is calculated from a predetermined map based on the engine rotation number Ne detected by the engine rotation number sensor 101 and an intake-air amount KL detected by the air flow meter 104.

As a result of the process, the engine rotation number Ne and the engine torque Te are controlled so as to accord with the operating line L. As described above, the operating line L is set such that: (i) in the region La where the engine rotation number Ne is smaller than the predetermined threshold Ne1, the operating line L is set on the optimum fuel efficiency line LF in which a fuel consumption relative to an engine power is minimized; and (ii) in the whole region Lb where the engine rotation number Ne equals to or larger than the threshold Ne1, the increasing amount of the engine torque Te relative to the increasing amount of the engine rotation number Ne from the same engine rotation number Ne is larger than that in the optimum fuel efficiency line LF (that is, the inclination of the operating line L is larger than that of the optimum fuel efficiency line LF). Accordingly, in the region where the engine rotation number Ne equals to or larger than the threshold Ne1, the increasing amount of the engine rotation number Ne relative to the increasing amount of the engine torque Te in the operating line L is smaller than that in the optimum fuel efficiency line LF. Accordingly, in the present embodiment, as compared to a case where the optimum fuel efficiency line LF is employed, an increase (that is, blow-up) of the engine rotation number Ne at the time when a driver steps on the accelerator pedal is restrained, and an increase of the engine torque Te is promoted. Accordingly, in the present embodiment, in a high rotation region where the engine rotation number equals to or larger than the threshold Ne1, it is possible to reduce uncomfortable feeling of drive due to insufficient acceleration feeling at the time when the driver steps on the accelerator pedal.

Note that, in the present embodiment, the increasing amount of the engine rotation number Ne relative to the increasing amount of the accelerator operation amount PAP is restrained though the operating line L deviates from the optimum fuel efficiency line LF. As a result, wasteful fuel consumption along with repetition of a sudden increase (blow-up) of the engine rotation number Ne and a return operation of the accelerator pedal in response to that is restrained, thereby making it possible to improve actual fuel efficiency.

Figure 4:
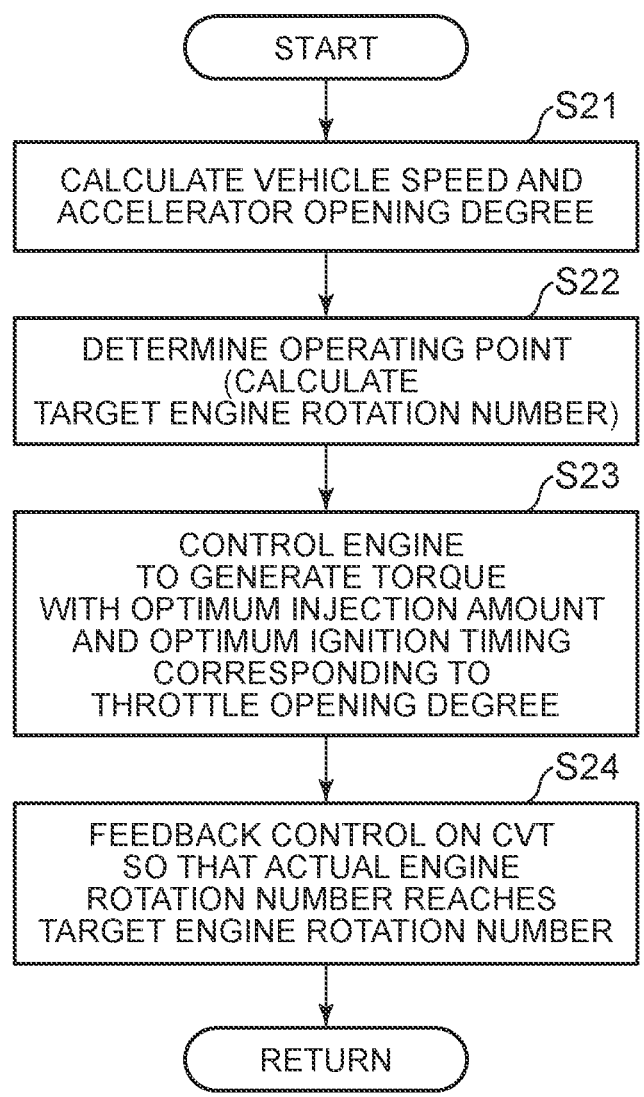
FIG. 4 is a flowchart illustrating a control processing routine of an engine and a continuously variable transmission in a modification of the first embodiment.

Further, in the first embodiment, the feedback of the engine torque is performed, but it is also possible to employ a control that does not perform the feedback of the engine torque. That is, for example, as illustrated in FIG. 4, the ECU 8 first calculates a vehicle speed v based on an output of the secondary pulley rotation number sensor 106 and calculates an accelerator operation amount PAP based on an output of the accelerator operation amount sensor 103 (S21). Subsequently, the ECU 8 calculates a target engine power based on the accelerator operation amount PAP and the vehicle speed v, selects an equal power line corresponding to the target engine power, and calculates a target engine rotation number Ne0 as an intersection point between the equal power line thus selected and the operating line L (S22). Then, the ECU 8 controls the engine 1 so as to generate a torque with an optimum injection amount and an optimum ignition timing corresponding to a throttle opening degree determined based on the accelerator operation amount PAP. Further, the ECU 8 performs a feedback control on the continuously variable transmission 4 so that an actual engine rotation number Ne reaches the target engine rotation number Ne0 (S24). According to this aspect, when the accelerator pedal is stepped on, an output rotation number of the continuously variable transmission 4 is determined, and an engine torque is determined in the course of events without the feedback. Accordingly, it is possible to restrain a minute change of a driving force due to the feedback control, thereby making it possible to reduce uncomfortable feeling of drive.

The following describes a second embodiment of the present disclosure. In the second embodiment illustrated in FIGS. 5 to 7, a plurality of operating lines Lm3, Lm2, Lm1, L0, L1, L2, L3 is provided, and one of them is selected in accordance with a driving intention of a driver.

Figure 5:
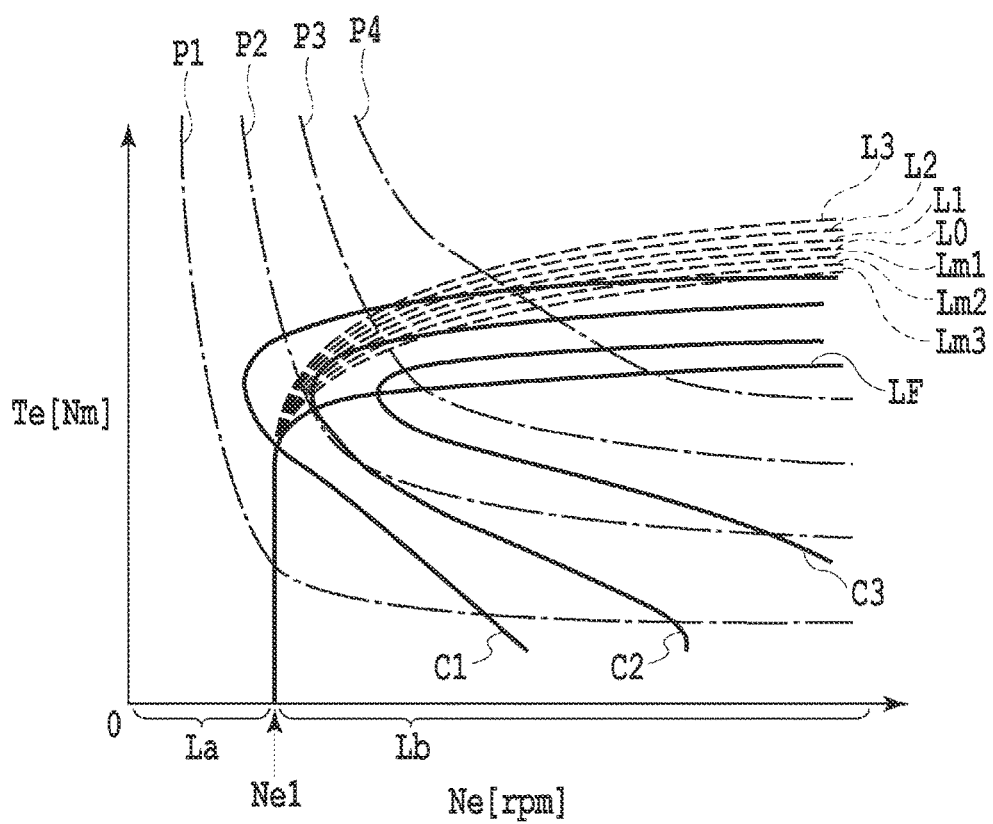
FIG. 5 is a graph illustrating operating lines and an optimum fuel efficiency line in a second embodiment on a coordinate plane with a horizontal axis indicative of an engine rotation number and a vertical axis indicative of an engine torque.

FIG. 5 is a graph indicative of equal fuel consumption ratio lines c1 to c3, equal power lines p1 to p4, an optimum fuel efficiency line LF, and operating lines Lm3, Lm2, Lm1, L0, L1, L2, L3, on a coordinate plane with a horizontal axis indicative of an engine rotation number Ne and a vertical axis indicative of an engine torque Te. Similarly to the operating line L (see FIG. 2) in the first embodiment, the operating lines Lm3 to L3 are set such that: (i) in a region La where an engine rotation number Ne is smaller than a predetermined threshold Ne1, the operating line accords with an optimum fuel efficiency line LF in which a fuel consumption relative to an engine power is minimized; and (ii) in a whole region Lb where the engine rotation number Ne is the threshold Ne1 or more, an increasing amount of the engine torque Te relative to an increasing amount of the engine rotation number Ne from the same engine rotation number Ne is larger than that in the optimum fuel efficiency line LF (that is, an inclination of the operating line is larger than that of the optimum fuel efficiency line LF).

In the second embodiment, in the region Lb where the engine rotation number Ne equals to or larger than the threshold Ne1, the operating lines Lm3 to L3 are configured such that respective engine torques Te at the same engine rotation number Ne have different values, and in the whole region Lb where the engine rotation number Ne equals to or larger than the threshold Ne1, values of respective engine torques Te at the same given engine rotation number Ne satisfy Lm3<Lm2<Lm1<L0<L1<L2<L3. That is, an upper limit of the engine torque Te at the same engine rotation number Ne is defined by the operating line L3, and a lower limit thereof is delimited by the operating line Lm3.

The ECU 8 of the present embodiment is configured to select an operating line having a larger engine torque Te relative to the engine rotation number Ne as a change amount dPAP of an accelerator operation amount PAP per time is larger, from among the plurality of operating lines Lm3 to L3. In the region Lb where the engine rotation number Ne equals to or larger than the threshold Ne1, the optimum fuel efficiency line LF is just illustrated for comparison in FIG. 5 and is not used in the controls of the engine 1 and the continuously variable transmission 4 in the present embodiment. That is, the ECU 8 in the present embodiment controls the engine 1 and the continuously variable transmission 4, so that an operating point determined by the engine rotation number Ne and the engine torque Te follows any one of the operating lines Lm3 to L3. Note that the other constituents in the second embodiment are similar to those in the first embodiment, so the same reference signs are assigned thereto and detailed descriptions thereof are omitted.

Figure 6:
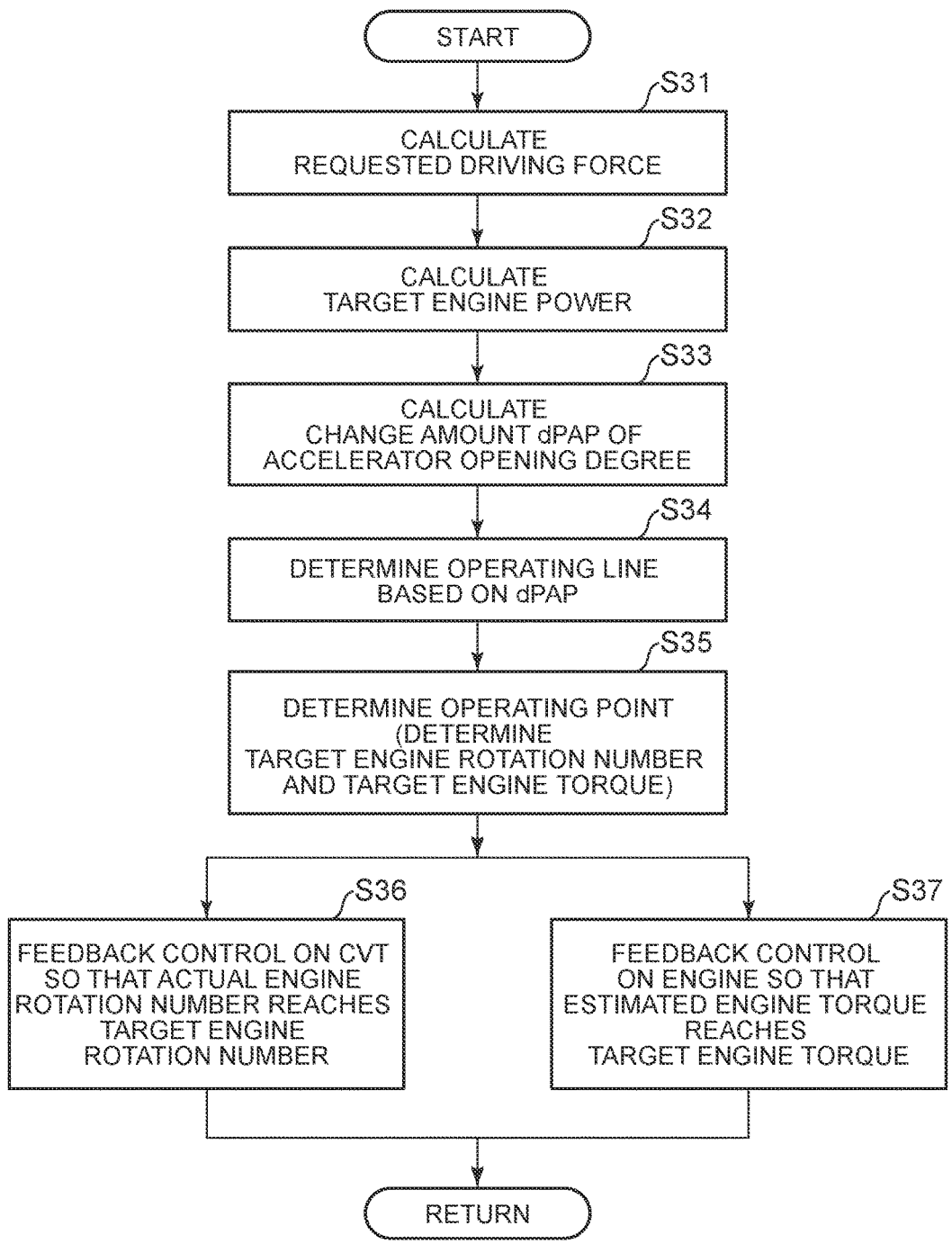
FIG. 6 is a flowchart indicative of a control processing routine of an engine and a continuously variable transmission in the second embodiment.

In the second embodiment, the controls of the engine 1 and the continuously variable transmission 4 are performed by the ECU 8 according to a flowchart of FIG. 6. The processing routine is executed repeatedly every predetermined control period Δt during an operation of the engine 1.

First, a requested driving force is calculated by the ECU 8 based on an accelerator operation amount PAP and a vehicle speed v (S31). Then, based on the requested driving force, a target engine power is calculated in the ECU 8 (S32). The processes of steps S31, S32 are similar to those of steps S11, S12 in the first embodiment.

Subsequently, the ECU 8 calculates a change amount dPAP of an accelerator operation amount based on an output of the accelerator operation amount sensor 103 (S33). More specifically, the ECU 8 subtracts an accelerator operation amount $PAP_{n-1}$ calculated in a previous control period from an accelerator operation amount $PAP_n$ calculated in the present control period so as to calculate the change amount dPAP of the accelerator operation amount.

Then, the ECU 8 determines an operating line based on the calculated change amount dPAP of the accelerator operation amount (S34). A value of the change amount dPAP of the accelerator operation amount is compared with reference values dPAPspdm2, dPAPspdm1, 0, dPAPspd1, dPAPspd2, and dPAPspd3, so as to select one of the operating lines Lm3 to L3 according to FIG. 7. These reference values dPAPspdm2 to dPAPspd3 have a relationship of dPAPspdm2<dPAPspdm1<0<dPAPspd1<dPAPspd2<dPAPspd3.

The selection of the operating lines Lm3 to L3 based on the change amount dPAP of the accelerator operation amount is specifically as follows. (i) In a case of dPAPspd3<dPAP, the operating line L3 is selected. (ii) In a case of dPAPspd2<dPAP≤dPAPspd3, the operating line L2 is selected. (iii) In a case of dPAPspd1<dPAP≤dPAPspd2, the operating line L1 is selected. (iv) In a case of 0<dPAP≤dPAPspd1, the operating line L0 is selected. (v) In a case of dPAPspdm1<dPAP≤0, the operating line Lm1 is selected. (vi) In a case of dPAPspdm2<dPAP≤dPAPspdm1, the operating line Lm2 is selected. (vii) In a case of dPAP≤dPAPspdm2, the operating line Lm3 is selected.

As illustrated in FIG. 7, a torque value of each point in the operating lines Lm3 to L3 is determined as a two-dimensional data array of a coefficient kxy (x=0 to 3, y=1 to 5) and a coefficient kmxy (x=1 to 3, y=1 to 5) to be multiplied by a torque value corresponding to a so-called accelerator fully opened state (Wide Open Throttle: WOT), which is a known value. An upward arrow in FIG. 7 indicates that the same content in its upper line applies thereto. That is, in a region La of 0<Ne<Ne1, the optimum fuel efficiency line LF is always selected regardless of the change amount dPAP of the accelerator operation amount, and in the region Lb where the engine rotation number Ne equals to or larger than the threshold Ne1, a different operating line is selected depending on a value of the change amount dPAP of the accelerator operation amount.

Then, the ECU 8 controls the engine 1 and the continuously variable transmission 4 according to the operating line determined as above. That is, the ECU 8 calculates a target engine rotation number Ne0 and a target engine torque Te0 by referring to the operating line thus determined, based on the target engine power (S35). Further, the ECU 8 performs a feedback control on a transmission ratio γ of the continuously variable transmission 4 so that an engine rotation number Ne reaches the target engine rotation number Ne0 (S36). In parallel with this, the ECU 8 adjusts various parameters of the engine 1 so that an estimated engine torque Te reaches the target engine torque Te0, so as to perform a feedback control on the engine 1 (S37). The processes of these steps S35 to S37 are the same as those of steps S13 to S15 in the first embodiment.

As described above, in the second embodiment, as the change amount dPAP of the accelerator operation amount PAP per time is larger, an operating line having a larger engine torque Te relative to the engine rotation number Ne is selected from among the plurality of operating lines Lm3 to L3. Accordingly, at the time of a sudden acceleration operation, a large engine torque Te can be obtained in response to this, and thus, drivability, i.e., driving comfortability can be improved.

Note that at least one of the plurality of operating lines in the disclosure may be an operating line derived from interpolation calculation based on other operating lines determined in advance. That is, as a modification of the second embodiment, for example, as illustrated in FIG. 8, a relationship between the change amount dPAP of the accelerator operation amount and each reference value dPAPspdm3 to dPAPspd3 (dPAPspdm3<dPAPspdm2) may be determined in a pinpoint manner, i.e., on one-to-one correspondence, and in a case where a calculated change amount dPAP of the accelerator operation amount does not accord with any reference value, an operating line may be determined by predetermined interpolation calculation. In this case, in a case where the change amount dPAP of the accelerator operation amount is placed between any two of the reference values dPAPspdm3 to dPAPspd3, the ECU 8 can find a new operating line by interpolation calculation (for example, linear interpolation) between a corresponding pair among the plurality of operating lines Lm3 to L3, so as to control the engine 1 and the continuously variable transmission 4 according to the new operating line.

Further, the configuration (S33, S34) to determine the operating line based on the change amount dPAP of the accelerator operation amount like the second embodiment is also applicable to the aspect illustrated in FIG. 4, that is, the control that does not perform the feedback of the engine torque.

Also, the second embodiment may be configured to further maintain the selection of the operating line based on the value of the calculated change amount dPAP of the accelerator operation amount for a predetermined time. For example, an index value A configured to promptly increase relative to an increase of an absolute value of the change amount dPAP of the accelerator operation amount and to decrease relative to a decrease of the absolute value of the change amount dPAP after a predetermined delay time may be provided, and in accordance with a comparison of the index value A with the reference values dPAPspdm3, dPAPspdm2, dPAPspdm1, 0, dPAPspd1, dPAPspd2, dPAPspd3, one of the operating lines Lm3 to L3 (or an operating line as an interpolation calculation result in a case where interpolation calculation is performed) may be selected. In this case, it is possible to restrain frequent changes of the operating line, thereby making it possible to execute stable driving. The delay time may be a fixed value or a variable value (e.g., a value that is larger as the absolute value of the change amount dPAP of the accelerator operation amount is larger).

Further, in a case of a vehicle having a so-called range hold function (that is, a function to limit a change range of the transmission ratio that continuously changes, to a desired range in accordance with a select input of a driver) instead of the configuration to use an elapsed time after the change of the accelerator operation amount PAP or in addition to such a configuration so as to maintain a selection state of the operating line as such, the driver may be able to maintain a selection state of the operating line by optionally using such a range hold function. With such a configuration, the driving intention of the driver can be further specifically reflected to the control.

Further, in the second embodiment, the operating line is selected based on the accelerator operation amount PAP and the change amount dPAP thereof. However, other publicly-known indexes indicative of the driving intention or driving taste of the driver, particularly, a sporty driving intention of the driver may be used for the selection of the operating line by the ECU 8 in the present disclosure. Such indexes can include, for example, any of the following: an operation frequency of the accelerator pedal; an operational speed or frequency of the brake pedal; a steering speed or a steering frequency; a longitudinal acceleration of the vehicle; a synthetic acceleration of a longitudinal acceleration and a lateral acceleration; and a select input by the driver using an input device (e.g., a running mode selecting switch and a shift lever electrically connected to the ECU 8).

This disclosure can be also applied to a hybrid vehicle including an internal combustion engine and a rotary electric machine as power sources, in addition to a vehicle including only an internal combustion engine as a power source. In this case, in a case where a power distribution mechanism for outputting a rotational power of the internal combustion engine to the rotary electric machine and to a driving-wheel side in a distributed manner is provided, the disclosure can be applied by regarding a configuration constituted by the rotary electric machine and the power distribution mechanism as an electric continuously variable transmission, and such a configuration also belongs to the criteria of the disclosure.

It should be considered that the embodiments disclosed herein are just examples in all respects and are not limitative. A scope of the disclosure is shown by Claims, not by the descriptions of the above embodiments, and intended to include every modification made within the meaning and scope equivalent to Claims.

What is claimed is:

1. A vehicle driving device comprising:
    an engine;
    a continuously variable transmission configured to change a speed of a rotational power transmitted from the engine and to output the rotational power to a driving-wheel side; and
    a controller configured to control the engine and the continuously variable transmission such that an operating point determined by a rotation number of the engine and an output torque of the engine follows at least one operating line, wherein
    in a region where the rotation number is smaller than a predetermined value, the operating line is set on an optimum fuel efficiency line,
    the optimum fuel efficiency line is a line that connects optimum fuel efficiency operating points determined in advance, and
    in a region where the rotation number equals to or larger than the predetermined value, an increasing amount of the output torque relative to an increasing amount of the rotation number in the operating line is larger than the increasing amount of the output torque relative to the increasing amount of the rotation number in the optimum fuel efficiency line.

2. The vehicle driving device according to claim 1, wherein:
    a plurality of operating lines is set in the region where the rotation number equals to or larger than the predetermined value,
    the plurality of operating lines has different values for the output torque at the same rotation number; and
    the controller is configured to select any operating line from among the plurality of operating lines based on an index indicative of a driving intention of a driver.

3. The vehicle driving device according to claim 2, wherein
    the controller is configured to select an operating line having a larger output torque at the same rotation number as an increasing amount of an accelerator operation amount per time is larger, from among the plurality of operating lines.

* * * * *